United States Patent [19]

Mizunuma et al.

[11] Patent Number: 6,045,251

[45] Date of Patent: *Apr. 4, 2000

[54] SHEET PROFILE CONTROL METHOD FOR BANK FORMATION

[75] Inventors: Koji Mizunuma; Satoru Nitta, both of Numazu, Japan

[73] Assignee: Toshiba Kikai Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,038

[22] Filed: Apr. 1, 1997

[30] Foreign Application Priority Data

Apr. 1, 1996 [JP] Japan .................................. 8-101916

[51] Int. Cl.$^7$ ............................................. C05C 3/12
[52] U.S. Cl. ................................. 364/149; 702/170
[58] Field of Search ...................... 702/45, 55, 166–170; 118/205, 258; 101/348; 427/428; 364/148, 149, 150, 153

[56] References Cited

U.S. PATENT DOCUMENTS

| 4,345,543 | 8/1982 | Pipkin ...................................... 118/106 |
|---|---|---|
| 4,475,478 | 10/1984 | Berdinner, Jr. et al. ................. 118/413 |
| 4,550,681 | 11/1985 | Zimmer et al. ......................... 118/410 |

*Primary Examiner*—John Barlow
*Assistant Examiner*—Craig Steven Miller
*Attorney, Agent, or Firm*—Armstrong, Westerman, Hattori, McLeland & Naughton

[57] ABSTRACT

A sheet profile for bank formation is controlled by using a system including a die and two rotational formation rolls arranged substantially to be parallel to each other at a downstream side of the die, in which a plastic material heated and plasticized is fed through a discharge port of the die in shape of sheet to an upstream side of a gap between the two formation rolls and a sheet is formed so as to provide a predetermined sheet profile by passing through the gap between the two rolls under pressure while forming a bank of the plastic material at the upstream side of the roll gap. The sheet profile control is performed by a method comprising the steps of measuring a bank profile of the bank formed to an upstream side of the roll gap and a sheet profile of a sheet fed out through the roll gap, operating an aimed bank profile corresponding to an aimed sheet profile from measured results of the bank profile and the sheet profile to obtain a deviation between the operated aimed bank profile and the measured bank profile, and adjusting a discharge amount distribution of the plastic material at the discharge port of the die to thereby control the sheet profile so as to have a uniform shape.

4 Claims, 5 Drawing Sheets

SHEET PROFILE CONTROL METHOD FOR BANK FORMATION

BACKGROUND OF THE INVENTION

The present invention relates to a bank formation in which a sheet formed of a plastic material such as plastics, rubber or the like is formed by passing a gap between opposing two rolls under being applied by a nipping pressure therebetween while forming a bank of the plastic material on an upstream side of the gap between the two rolls, and more particularly, to a method of controlling a sheet profile for the bank formation so as to provide a sheet having a uniform thickness by changing a bank profile in a range of the bank amount in which any bank mark due to the excessive bank amount is prevented from causing and any touch fault due to the less bank amount is also prevented from causing.

In a conventional bank formation of such art field, when a sheet having relatively large thickness is formed, there is adopted a method, for the purpose of improving the surface condition of the sheet to be formed, of supplying, and then rolling, a plastic material, which is heated and plasticized and is pushed out in sheet shape through a discharge port of a die, between two formation rolls. In this method, since the sheet is subjected to rolling and transferring functions by the two formation rolls, the surface brightness and the surface smoothness of the sheet can be improved, and a bank of a plastic material such as fused resin is formed on the upstream side of the gap between the two formation rolls. Further, the term "upstream" referred to herein is used with reference to the flow of the fused material or sheet.

In such sheet formation method for forming the bank, called hereinafter bank formation or bank formation method, a fault is caused on the surface of the sheet formed in the case of excessive amount of the bank or in the case of less amount thereof. Accordingly, it is required to adjust the bank amount in a range not to cause any fault, and moreover, it is also required to adjust the sheet thickness in a predetermined allowable range in accordance with objects or conditions for use. That is, in the bank formation, it is important to form the bank while suitably maintaining the bank amount and uniformly keeping the thickness of the sheet to be formed.

The applicant of the subject application has provided the following two methods for solving the above mentioned problems in the conventional method such as disclosed in the Japanese Patent Publication No. HEI 6-37065.

The first method is one for controlling or adjusting a discharge amount from a die to make uniform the bank amount in the cross direction thereof.

In this method, however, although the bank profile can be controlled, the sheet profile cannot be controlled because of no consideration of data concerning the sheet thickness. That is, the central portion of the sheet profile is made thickened because of deflection of the rolls. Furthermore, in a case where the gap between the two rolls provides an oblique shape, the formed sheet profile also has an oblique shape.

The second method is one for controlling the sheet profile by causing a traverse flow in the cross direction of a plastic material at the bank portion through the adjustment of the gap between the two rolls.

In this method, however, since the gap is adjusted by forcibly bending the rolls, it is impossible to adjust or remedy a sheet profile having small pitches of recessed and protruded portions and irregular thickness.

Furthermore, there has been further provided a conventional ordinary method, as a third method, in which a thickness gauge for measuring the thickness of the sheet is arranged and the discharge amount of the die is controlled by feeding back the thickness data measured by the thickness gauge, thereby maintaining constant the thickness of the sheet.

In this third method, however, although the thickness of the sheet can be controlled in a case of less traverse flow of the plastic material at the bank portion, much time is required till the controlling has been completed because the movement of the plastic material from the die to the thickness gauge takes a time of 10 to 30 minutes. Moreover, in this method, since the controlling cannot be adapted immediately to the change of the sheet thickness due to disturbance such as temperature change of the die, the possibility of providing products having faults will be increased. Still furthermore, since the bank amount is not considered, the surface of the sheet may be damaged.

SUMMARY OF THE INVENTION

An object of the present invention is to substantially eliminate defects or drawbacks encountered in the prior art described above and to provide a sheet profile control method for a bank formation capable of carrying out the sheet profile adjustment working automatically with high performance and high speed.

This and other objects can be achieved according to the present invention by providing a method of controlling a sheet profile for bank formation using a system including a die and two rotational formation rolls arranged substantially to be parallel to each other at a downstream side of the die, in which a plastic material heated and plasticized is fed through a discharge port of the die in shape of sheet to an upstream side of a gap between the two formation rolls and a sheet is formed so as to provide a predetermined sheet profile by passing through the gap between the two rolls under pressure while forming a bank of the plastic material at the upstream side of the roll gap, the sheet profile control method comprising the steps of:

measuring a bank profile of the bank formed to an upstream side of the roll gap and a sheet profile of a sheet fed out through the roll gap;

calculating an aimed bank profile related with an aimed sheet profile from the measured bank profile and sheet profile; and adjusting a discharge amount distribution of the plastic material at the discharge port of the die to thereby control the bank profile so as to obtain the aimed sheet profile.

In this method, the sheet profile means the cross directional distribution of the thickness of the sheet and the bank profile means the distribution of the bank amount in the sheet cross direction.

Since the primary object of the present invention is to form a sheet profile having a predetermined dimension, in the basic principle, the sheet profile is controlled to the aimed one by measuring the actual sheet profile, feeding back the same and adjusting the distribution of the discharge plastic material from the die.

However, when a sheet having a large thickness is formed, about 10 to 30 min. is generally taken till a sheet of the plastic material discharged from the die travels to a thickness measuring position, and accordingly, in a case where a control system for controlling the discharge amount from the die through the feed-back of the measured value of the sheet profile is controlled, much time is taken up to the time when the sheet profile provides a predetermined dimension. In addition, in a case where the discharge amount distribution is changed due to disturbance such as temperature change of the die, it is difficult to promptly deal with such matter.

As mentioned before, in order to prevent such loss time and occurrence of defective product, according to the present invention, the sheet profile is controlled through the cascade control process by utilizing the relative relationship between the bank profile and the sheet profile as mentioned hereinbefore.

That is, the sheet profile and the bank profile are respectively measured, and the aimed bank profile is calculated from the deviation between the measured sheet profile and the aimed sheet profile and the measured bank profile. Next, the discharge amount distribution in the cross direction of the die is adjusted through the deviation between the aimed bank profile and the measured bank profile.

At this time, since the bank profile is measured at a portion closely near to the die, the measurement does not take much time from the discharging of the plastic material from the die even in the formation of a thickened sheet. For this reason, the discharge amount from the die can be promptly amended by utilizing the bank profile for the control of the sheet profile even if the discharge amount is not proper. In addition, even in the case where the discharge amount distribution is changed due to disturbance such as temperature change of the die, this can be promptly dealt with.

The relative relationship between the bank profile and the sheet profile may be obtained by storing, in a memory means, data obtained through an actual experiment, but the aimed bank profile corresponding to the aimed sheet profile can be easily obtained by an operational equation. This will be mentioned as a preferred embodiment of the present invention.

That is, in the sheet profile control method mentioned above, the aimed bank profile is calculated in accordance with the following equation in which a letter T denotes a thickness of a sheet, S is a roll gap width, H is a bank size and a letter b is a constant determined by a roll diameter and a viscosity of a plastic material to be used:

$$H = \frac{S\sqrt{T-S}}{bS^2 - \sqrt{T-S}}$$

Still furthermore, in the case where the initial state of the gap between the two rolls is not uniform in the cross direction thereof, if the sheet profile is controlled only by the process mentioned above, the bank amount becomes large at a portion at which the roll gap is narrow, which may result in an occurrence of defective such as bank mark, and substantially the same state will be caused when the formation roll is bent by the pressure of the plastic material at the bank portion. Then, the cross directional distribution of the roll gap is adjusted at the same time of the adjustment of the discharge distribution of the plastic material to thereby widen a portion of the roll gap at which the bank profile is large or make narrow a portion of the roll gap at which the bank profile is small. Through such processes, substantially the uniform bank profile and uniform sheet thickness can be provided.

Further, the bank profile is first operated, and when the aimed bank profile does not exceed over both the upper and lower limits of the predetermined range, the aimed bank profile is changed as it is to control the sheet profile, and on the other hand, only at a time when the operated aimed bank profile exceeds upper or lower limit of a predetermined range, the cross directional distribution of the roll gap may be performed to carry out the effective control substantially with no operational loss.

The nature and further features of the present invention will be made more clear from the following descriptions with reference to the accompanying drawings.

DESCRIPTION OF THE PREFERRED EMBODIMENT

The present invention will be described hereunder by way of an example shown in the accompanying drawings.

Figure 1:
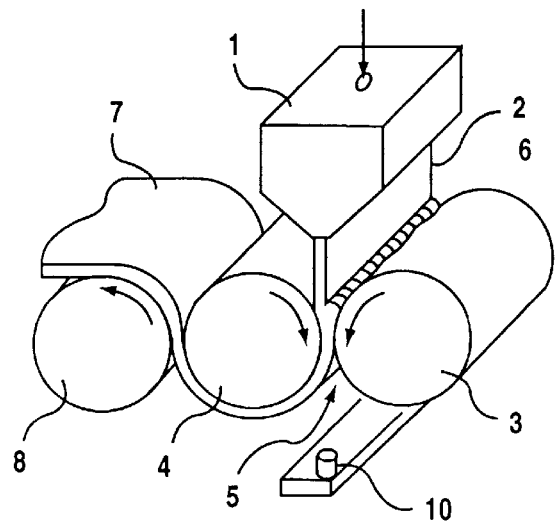
FIG. 1 is a schematic view illustrating a basic structure of a molding machine to which a sheet profile control method for bank formation according to one embodiment of the present invention is applicable.
Figure 2:
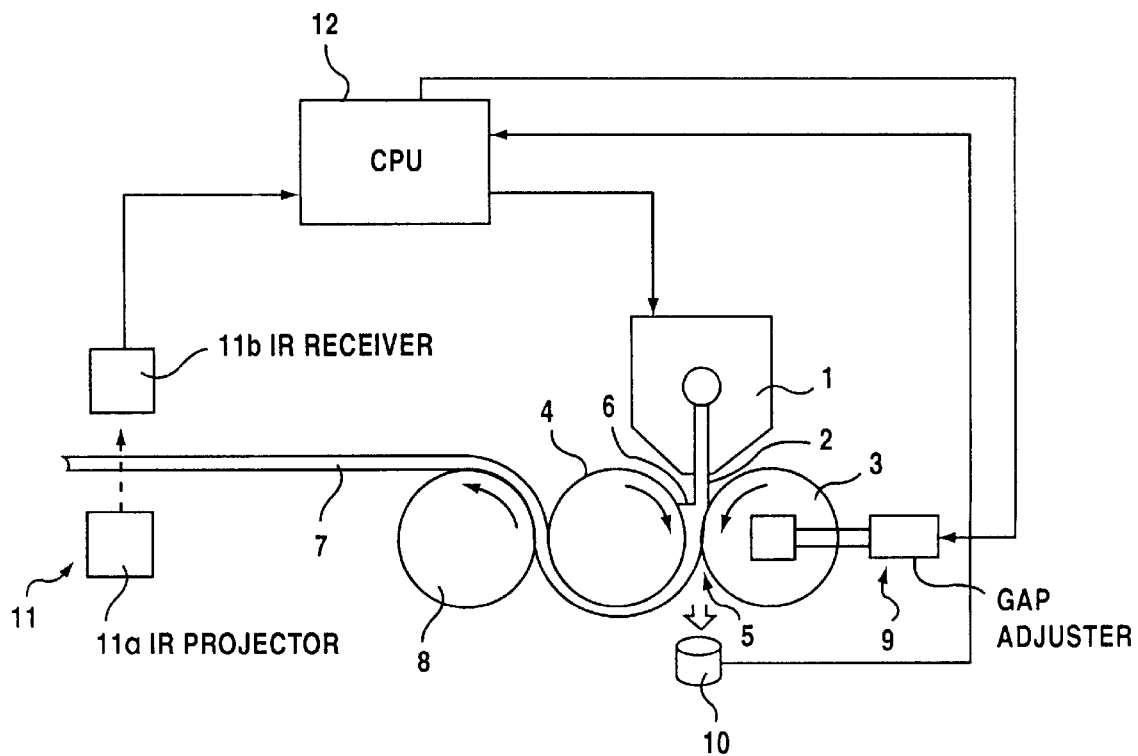
FIG. 2 is a diagram showing a control system of the molding machine of FIG. 1.

FIGS. 1 and 2 shows a basic structure of a molding machine and a control system adapted to the sheet profile control method for the bank formation according to the present invention. Referring to FIGS. 1 and 2, reference numeral 1 denotes a die for draining or discharging a fused resin 2 as plastic material which is heated and plasticized to a predetermined temperature, and first and second rolls 3 and 4 are arranged on the downstream side of the discharge port of the die 1. The die 1 has a function to adjust the cross directional distribution of the discharge amount of the plastic material and, though not shown, is provided with a cross directional distribution adjusting mechanism. The two rolls 3 and 4 are arranged substantially in parallel to each other and is controlled so as to provide a desired temperature and to be rotated at a desired rotational speed.

Then, the fused resin 2 is supplied in shape of sheet to the upstream side of the gap 5 formed between the two rolls 3 and 4 from the discharge port of the die 1, and the supplied fused resin, i.e. plastic material, 2 is nipped by the rolls 3 and 4 while forming the bank 6 of the plastic material 2 on the upstream side of the gap 5 to thereby form a sheet 7 having a predetermined sheet profile. The sheet 7 is conveyed to the downstream side under the state that the sheet 7 is wound itself around the surface of the one, second, roll 4, then passes through the gap between the second and third rolls 4 and 8 and, thereafter, is conveyed to the further downstream side under the state that the sheet 7 is wound itself around the surface of the third roll 8.

A gap adjusting mechanism 9 is provided for the first roll 3 to adjust the gap 5 between the first and second rolls 3 and 4. As such gap adjusting mechanism 9, there may be adopted a mechanism for a roll close method or a roll bending method, and FIG. 3 shows one example of roll bending mechanism.

Figure 3:
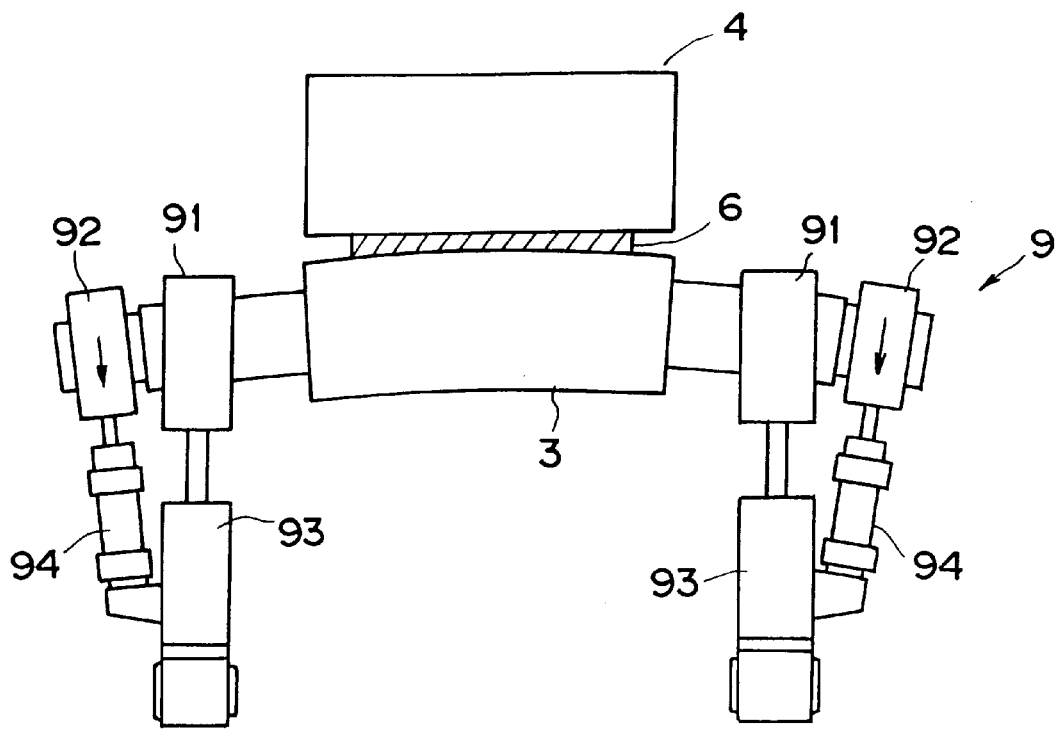
FIG. 3 shows one example of a mechanism for adjusting a gap between two rolls.

That is, with reference to FIG. 3, auxiliary bearings 92 are mounted to respective end portions outside main bearings 91 mounted to a support member of the first roll 3, and to each of the main bearings 91, are provided a main hydraulic cylinder 93 for moving forward or backward the second roll 4 with respect to the first roll 3 and an auxiliary cylinder 94 having one end fixed to the main cylinder 93 and the other end fixed to the auxiliary bearing 92. According to this structure, when the auxiliary cylinders 94 are expanded or contracted, bending moments for bending the first roll 3 against the bank rolling pressure act to the first roll 3 to thereby adjust the gap 5 between the rolls 3 and 4 in the sheet cross direction.

A bank sensor 10 for measuring the bank profile is further disposed on the downstream side of the gap 5 between the rolls 3 and 4. The bank sensor 10 serves to assume the bank amount from the surface temperature of the sheet 7 conveyed through the gap 5. The bank sensor 10 is, preferably, a non-contact type temperature sensor for measuring the distribution of the bank amount in the sheet cross direction. An infrared ray radiation thermometer will be utilized as such non-contact type temperature sensor 10 to measure the sheet temperature immediately after the gap 5.

Furthermore, a thickness gauge 11 for measuring the thickness T of the sheet 7 is disposed on the downstream side of the third roll 8. This thickness gauge 11 is composed, in the illustrated example, an infrared ray projector 11a and an infrared ray sensor 11b receiving an infrared ray projected from the infrared ray projector 11a and passing through the sheet 7, thus measuring the thickness distribution in the cross direction of the sheet 7.

Then, the data of the thickness T measured by the thickness gauge 11 and the data of the bank amount H measured by the bank sensor 10 are inputted into a computer such as CPU 12 in FIG. 3, in which these data are operated to output a control signal for the discharge amount distribution to the die 1 and a control signal for the gap adjustment to the roll gap adjusting mechanism 9.

Figure 4:
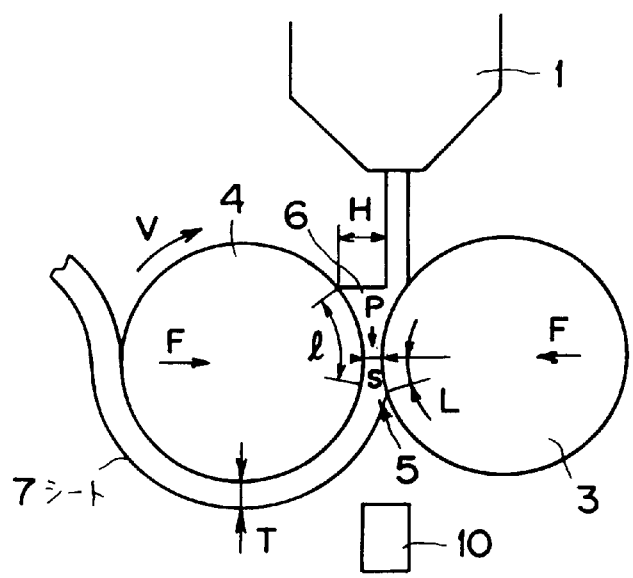
FIG. 4 is an illustration of an arrangement of two rolls and a die for the explanation of the relationship between a bank amount, a roll gap and a sheet thickness.

FIG. 4 is an illustration for showing a relationship between the bank amount H, the sheet thickness T and the roll gap 5 at the bank portion 6.

In the illustrated embodiment, although the bank amount H is considered in the horizontal dimension from a contacting portion of the bank portion 6 to the second roll 4 and a root position of the fused resin discharged in sheet shape, it may be taken by a height from the central position of the roll gap 5 to the upper surface of the bank portion 6.

In the next, supposing a case in which the feeding amount of the fused resin 2 is increased to the bank portion 6 at only one portion thereof in the cross direction without changing the gap dimension S and the peripheral speed V of the roll and without considering any transverse flow of the fused resin 2 at the bank portion 6, the bank amount itself is increased because the amount of the fused resin 2 to be fed to the bank portion 6 is increased, and as a result, a pressure P caused in the bank portion 6 is made high. Thus, the amount of the fused resin 2 flowing the roll gap 5 is increased and the thickness T of the sheet is hence increased, and the bank amount H is stabilized at the time when the amount of the fused resin 2 fed to the bank portion 6 is made equivalent to the amount thereof discharged from the bank portion 6. That is, in the case of less transverse flow of the fused resin 2 at the bank portion 6, the sheet profile itself is determined by the distribution of the discharge amount, in the cross direction, from the die 1. The bank profile has a relative relationship to the sheet profile.

Substantially the same matter will be applied to the case of changing the roll gap 5 without changing the feed amount of the fused resin 2 from the die 1. When the roll gap 5 is adjusted to be narrow, the thickness T of the sheet 7 becomes temporarily thin and the bank amount H is increased. However, when the bank amount H is increased, since the amount of the fused resin 2 flowing the gap 5 between the rolls 3 and 4 is also increased by the pressure P in the bank portion 6, the bank amount H is stabilized in a state in which the amount of the fused resin 2 fed into the bank portion 6 becomes equal to the amount thereof discharged from the bank portion 6.

As can be understood from the above disclosure, at the time of small transverse flow of the fused resin 2 in the bank portion 6, the sheet profile can be controlled by adjusting the distribution of the discharge amount from the die and the bank profile can be controlled by adjusting the roll gap 5 without changing the sheet profile.

In the present invention, the sheet profile is controlled by a cascade control process in consideration of the relative relationship between the bank profile and the sheet profile.

The control sequence of the sheet profile of the present invention will be explained with reference to the flowchart of FIG. 5.

Figure 5:
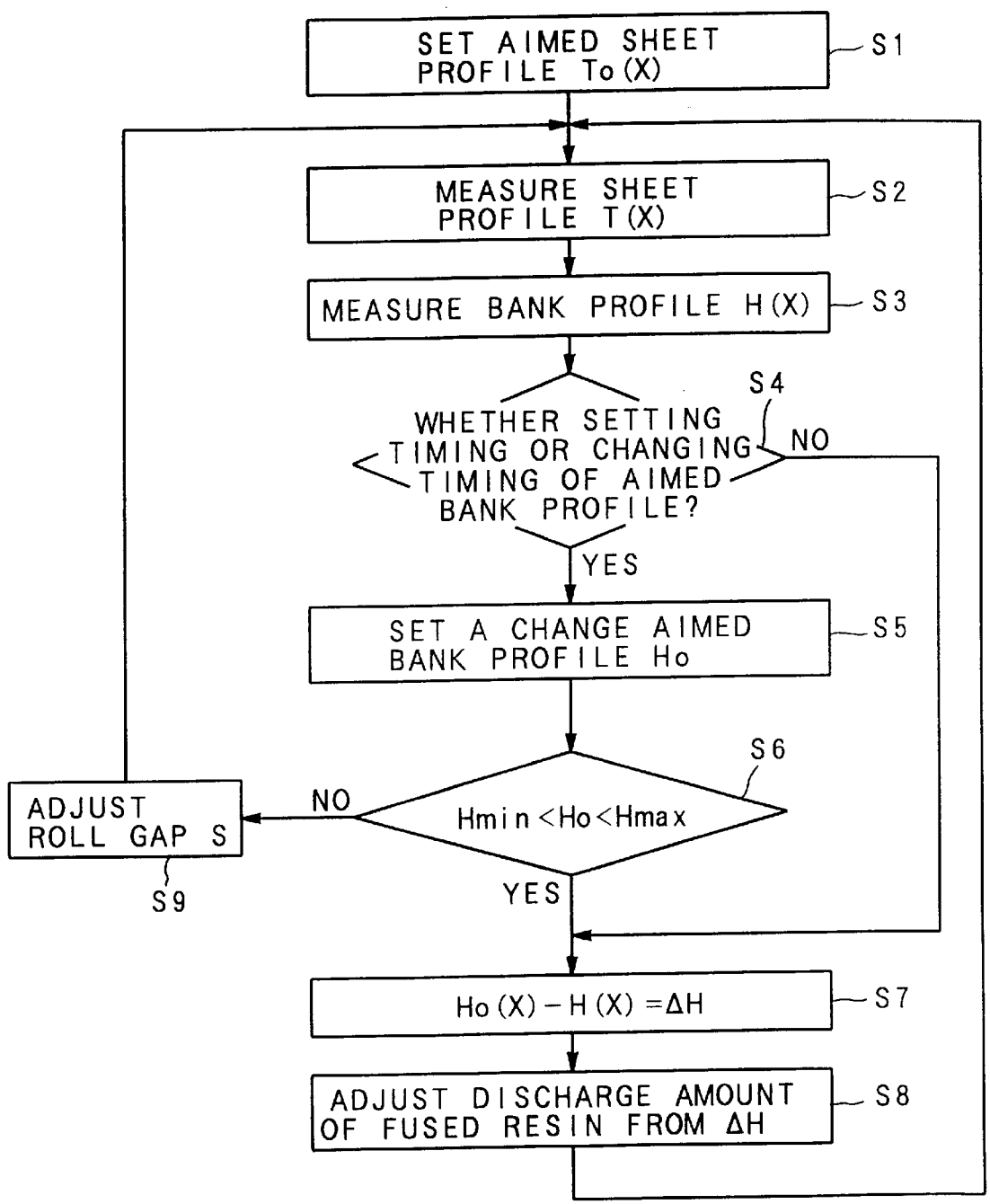
FIG. 5 is a flowchart representing a control sequence according to the present invention.

With reference to the flowchart of FIG. 5, a predetermined sheet profile T0(x) as an aimed profile is first set (step S1). Next, a sheet profile T(x) and a bank profile H(x) are measured by the thickness gauge 11 and the bank sensor 10, respectively (steps S2 and S3).

In steps S4 to S8, a deviation $\Delta T(x)$ between the measured sheet profile T(x) and the aimed sheet profile T0(x) is calculated and an operation for modifying the measured bank profile H(x) is performed in accordance with the deviation $\Delta T(x)$ to thereby obtain the aimed bank profile H0(x). These sheet profile T(x) and bank profile H(x) are informations related to the measuring position x in the cross direction of the sheet.

The distribution of the discharge amount of the fused resin from the die 1 in the cross direction is adjusted in term of the deviation $\Delta H(x)$ between the measured bank profile H(x) and the aimed bank profile H0(x).

At this time, since the bank profile H(x) is measured at a portion closely near the die 1, the measuring time after the sheet 7 being fed from the die 1 is short even in a thickened sheet. For this reason, even in a case where the discharge from the die 1 is not properly adjusted in amount, the discharge amount distribution can be promptly adjusted by utilizing the bank profile H(x) for control. Furthermore, the deviation between the measured bank profile H(x) and the aimed bank profile H0(x) can be made small by performing the adjustment of the discharge amount distribution in plural times. Through such adjustment of the discharge amount distribution in a repeated manner, the aimed bank profile is changed when reaching the aimed bank profile H0(x) changing timing. This changing timing is predetermined to a time interval longer than a time at which the sheet runs from the bank profile measuring position to the sheet profile measuring position, and the aimed bank profile H0(x) can be changed in consideration of the correspondence between the bank profile and the sheet profile. These processes are represented by steps S4 and S5 in the flowchart of FIG. 5.

The aimed bank profile H0(x) is obtained from the sheet profile T(x) and the bank profile H(x) in the following manner.

The relationship between a roll gap dimension S, a bank amount H and a sheet thickness T was obtained by using a simple resin flow model and will be represented by the following equations, and when such relationship was obtained, it was assumed that (I) no convection flow and transverse flow are caused in the bank portion 6 and (II) the resin provides a uniform physical property in the bank portion 6. A parallel flat flow equation is applied to the fused resin flow in the roll gap 5, and the flow amount thereof is converted to the thickness of the sheet T such as in the following equation (1)

$$T = S + \frac{S^{n+2}}{2^{n+1}(n+2)\eta V} \left(\frac{P}{L}\right)^4 \quad (1)$$

T (m): sheet thickness
S (m): roll gap dimension
n: viscosity index (power law index)
η (Pa s): apparent viscosity
P (N): pressure by roll rotation
V (m/s): roll peripheral speed
L (m): contact length of sheet and roll in which the letter P is assumed as a function of a rolling pressure F of the roll and this pressure F was obtained through G. Ardihivil equation such as:

$$F = \eta V D \left(\frac{1}{S} - \frac{1}{H+S}\right) \quad (2)$$

D (m): roll diameter
H (m): bank size

The above equations (1) and (2) are simplified and further amended in view of experimental values, thereby obtaining the following empirical equation (3).

$$T = S + B \frac{H^2 S^4}{(H+S)^2} \quad (3)$$

in which the letter B is a constant determined by the roll diameter, the viscosity etc., which is calculated by measuring the bank size at an actual forming process. This equation (3) will be modified as follows.

$$H = \frac{S\sqrt{T-S}}{bS^2 - \sqrt{T-S}}$$
$$b = \sqrt{B}$$

According to this equation, the aimed bank profile H0(x) can be calculated at a time of requiring the uniform sheet profile T(x).

In a case where the initial state of the roll gap 5 is not uniform, if the thickness control is performed only by the method mentioned above, the bank amount H is made large at a narrow portion of the roll gap 5, resulting in the possibility of occurrence of formation defect such as bank mark. Further, substantially the same matter will be caused at a time when the roll is bent by the resin pressure of the bank portion 6.

Then, the following processes are performed to make uniform the bank profile H(x) and the sheet thickness. That is, the discharge amount distribution of the fused resin 2 is adjusted and, at the same time, the cross directional distribution of the gap 5 between the two rolls 3 and 4 is also adjusted so that the roll gap portion at which the bank profile H(x) is large is widened and the roll gap portion at which the bank profile H(x) is small is made narrow.

Further, more effective controlling may be performed in the manner such that the aimed bank profile H0(x) is first operated, and in the case where this aimed bank profile H0(x) does not exceed over the predetermined upper limit Hmax and the lower limit Hmin, the aimed bank profile H0(x) is changed as it is to thereby control the sheet profile T(x) and in the case where this aimed bank profile H0(x) exceeds over the predetermined upper limit Hmax and the lower limit Hmin, the cross directional distribution of the roll gap 5 is adjusted as in steps S6, S7 in FIG. 5.

Under the above state, the uniform bank profile and the sheet having uniform thickness can be obtained by widening a roll gap portion S(x) at which the bank profile H(x) is large and by making narrow a roll gap portion S(x) at which the bank profile H(x) is narrow. By narrowing the roll gap dimension, the sheet thickness is made uniform with substantially the uniform bank profile H(x).

An preferred example by utilizing the present invention will be described hereunder with reference to FIG. 6.

PMMA was used as an initial material, and the sheet has a width of 150 mm and a thickness of about 0.9 mm.

Figure 6A:
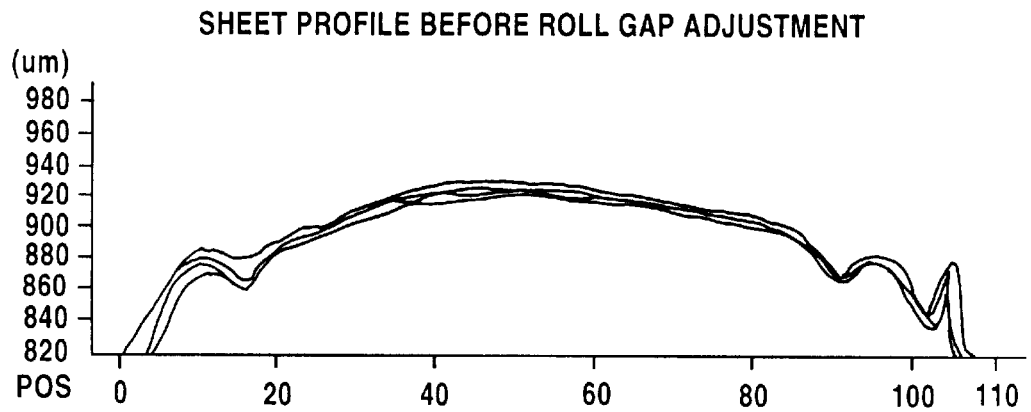
FIGS. 6A to 6F are views showing experimental results according to the present invention.
Figure 6B:
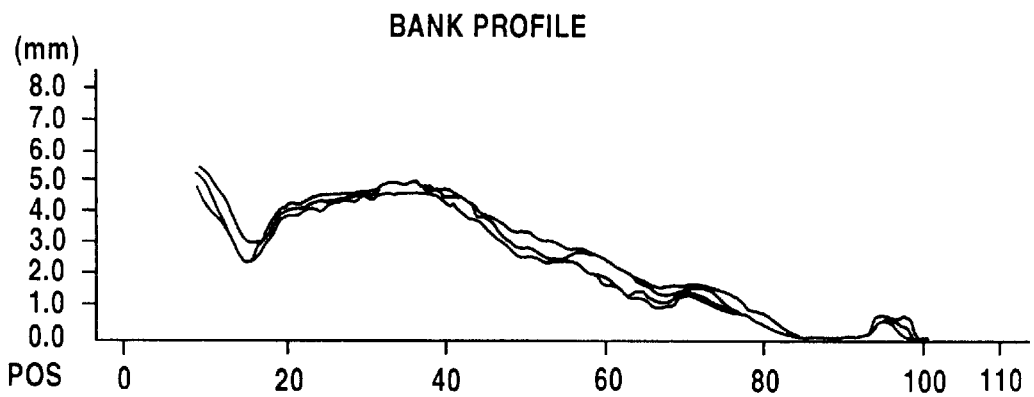

FIGS. 6A and 6B represent the sheet profile and the bank profile before the adjustment of the roll gap 5. In this state, since the roll gap 5 is not uniform, the bank amounts on the left side of the figures are large and the sheet thickness is large at the central portion thereof through the bending of the roll. In this state, when the bank profile was calculated to make substantially uniform the sheet thickness by using the equation (4), the bank amount was further made large on the left side of the figure, which may result in defective formation such as occurrence of bank mark. Thus, the roll gap was first adjusted to make substantially flat the bank amount.

Figure 6C:
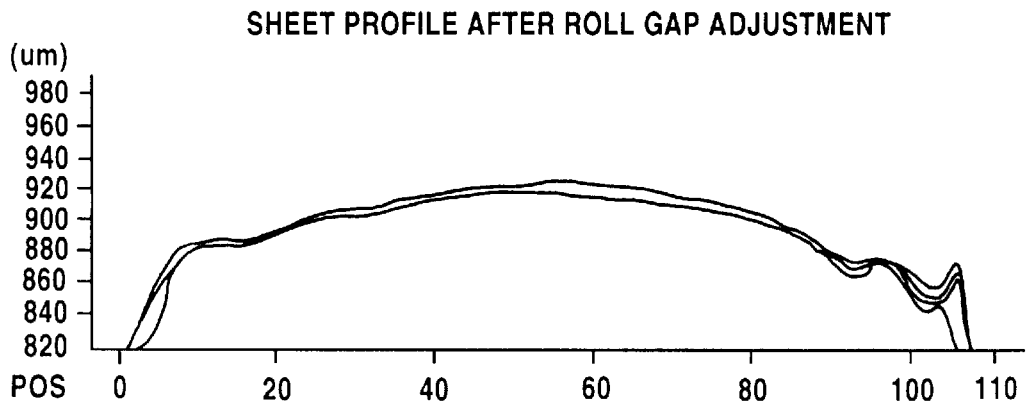
Figure 6D:
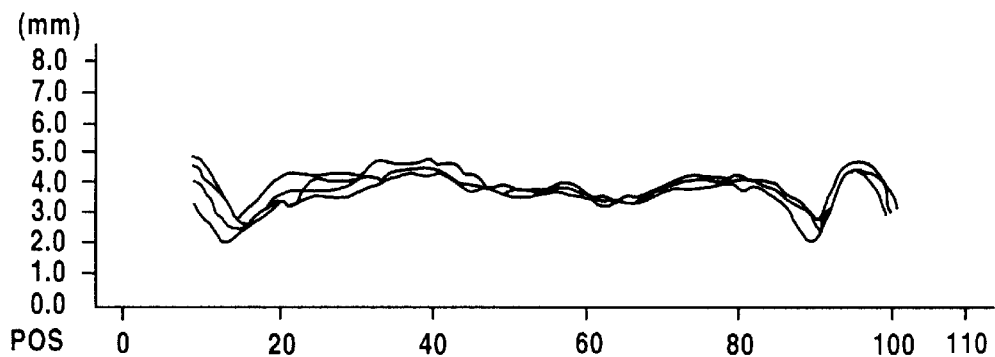

FIGS. 6C and 6D are graphs which show states after the roll gap was adjusted from the states shown in FIGS. 6A and 6B, in which the left side roll gap is widened and the right side roll gap is narrowed. Through these processes, the bank profile was not substantially changed, but the bank amount was made substantially flat. However, the sheet provided the central portion having a thickness larger than about 4% with respect to the end portions thereof.

Figure 6E:
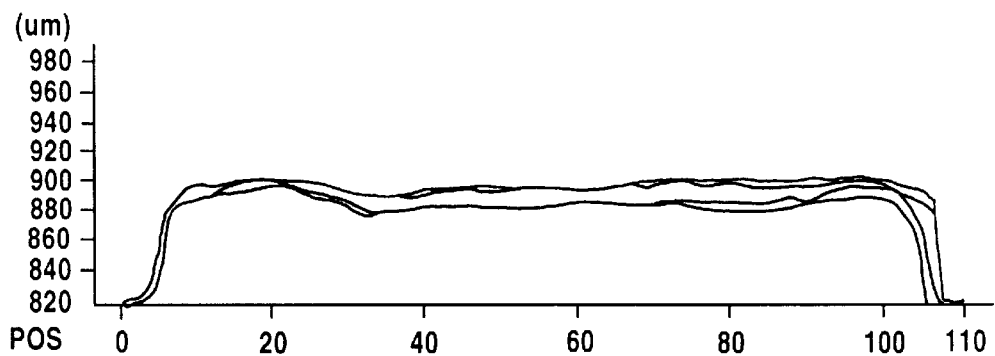
Figure 6F:
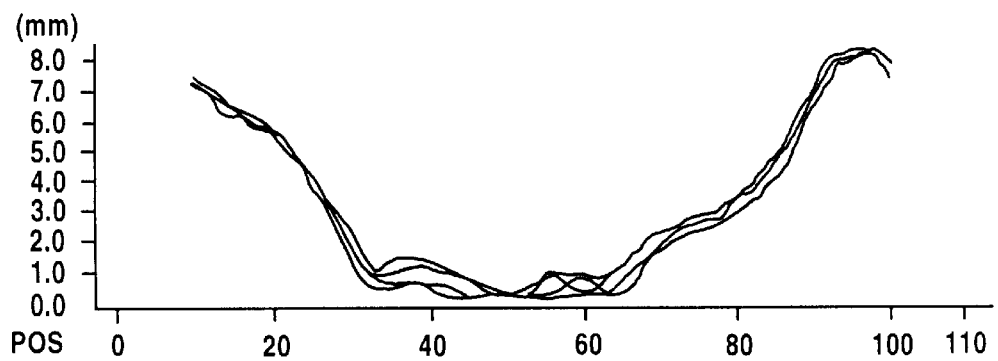

FIGS. 6E and 6F are graphs which show states after the calculation of the aimed bank profile from the sheet thickness obtained by the equation (4) to thereby control the bank profile. In this state, although both the ends of the bank profile are made large, the sheet provided substantially the uniform thickness. From the shown states, the roll gap was adjusted so that the central portion thereof is narrowed by using a roll bending means as in the states of 6C and 6D, whereby the sheet thickness and the bank amount could be both made uniform.

According to the present invention of the characters described above by way of the preferred embodiment, the bank profile and the sheet profile are respectively measured by utilizing the relative relationship therebetween, the aimed bank profile corresponding to the aimed sheet profile is calculated from the measured results, and the discharge amount distribution of the plastic material in the cross direction of the die is adjusted through the deviation between the aimed bank profile and the measured bank profile. Accordingly, even in the case where the discharge amount from the die is not proper or where the discharge amount distribution is changed due to the temperature change, for example, of the die, the discharge amount can be promptly amended, thus realizing the automatic adjustment of the sheet thickness with high performance and at high speed.

Furthermore, by adjusting the discharge amount distribution of the plastic material and, at the same time, adjusting roll gap in the cross direction of the die, the sheet thickness can be made uniform while maintaining the proper bank amount. Particularly, the automatically adjusting working with high speed can be further improved by performing the roll gap adjustment only in the case where the operated aimed bank profile exceeds over the predetermined range.

What is claimed is:

1. A method of controlling a sheet profile for bank formation using a system including a die and two rotational formation rolls arranged substantially to be parallel to each other at a downstream side of the die, in which a plastic material heated and plasticized is fed through a discharge port of the die in shape of sheet to an upstream side of a gap between the two formation rolls and a sheet is formed so as to provide a predetermined sheet profile by passing through the gap between the two rolls under pressure while forming a bank of the plastic material at the upstream side of the roll gap, the sheet profile control method comprising the steps of:

measuring a bank profile of the bank formed to an upstream side of the roll gap and a sheet profile of a sheet fed out through the roll gap;

operating a deviation between the measured sheet profile and an aimed sheet profile;

operating an aimed bank profile corresponding to the aimed sheet profile from the measured bank profile and the operated deviation;

operating another deviation between the aimed bank profile and the measured bank profile, and adjusting a discharge amount distribution of the plastic material at the discharge port of the die so as to eliminate the another deviation and control the sheet profile so as to have a uniform shape.

2. A sheet profile control method according to claim 1, wherein said aimed bank profile is calculated in accordance with the following equation in which a letter T denotes a thickness of a sheet, S is a roll gap width, H is a bank size and a letter b is a constant determined by a roll diameter and a viscosity of a plastic material to be used.

$$H = \frac{S\sqrt{T-S}}{bS^2 - \sqrt{T-S}}.$$

3. A sheet profile control method according to claim 1, further comprising the step of adjusting a distribution of the gap between two formation rolls in a cross direction thereof.

4. A sheet profile control method according to claim 3, wherein the gap distribution adjustment step is performed only at a time when the operated aimed bank profile exceeds upper or lower limit of a predetermined range.

* * * * *